May 5, 1942.  T. R. SCOTT ET AL  2,282,004
METHOD OF AND MEANS FOR TERMINATING ELECTRIC CABLES

Original Filed Aug. 13, 1935

INSULATION IMPREGNATED WITH STYRENE AND POLYMERIZED

POLYMERIZED STYRENE BARRIERS

POLYMERIZED STYRENE JOINT OR DIVIDING BOX

INVENTORS
T. R. SCOTT
J. K. WEBB

BY

ATTORNEY.

Patented May 5, 1942

2,282,004

UNITED STATES PATENT OFFICE 2,282,004

METHOD OF AND MEANS FOR TERMINATING ELECTRIC CABLES

Thomas Robertson Scott and John Krauss Webb, London, England, assignors to International Standard Electric Corporation, New York, N. Y.

Original application August 13, 1935, Serial No. 35,960. Divided and this application May 18, 1940, Serial No. 335,894. In Great Britain January 1, 1935

2 Claims. (Cl. 174—20)

This application is a division of our co-pending application Serial No. 35,960, filed August 13, 1935, and issued July 30, 1940, as Patent No. 2,209,894.

A considerable amount of trouble is experienced in connection with terminations of cables particularly on H. T. lines where the cables are impregnated with oil or like insulating compound. Much of this trouble has been due to difficulty in grading or easing off the electrical stress, but the condenser cone invention of the present applicants described in U. S. Patent No. 1,935,820 has provided a simple remedy for this type of trouble. Another cause of trouble is however, the physical mechanical arrangement involved by present practice. The prevention of flashover in open air where humidity and atmospheric pollution (e. g. soot, salt etc.) are encountered necessitates the use of a large porcelain insulator. This must be provided with a metal cap and base, the latter being bolted to a gland which is in turn plumbed to the lead sheath of the cable. The metal parts are in general cemented to the porcelain and all joints have to be washered with oil-resisting material which in general is unsatisfactory. The sealing bell must moreover, be filled or partially filled with insulating compound which covers the end of the cable.

This somewhat cumbersome arrangement has to withstand fairly severe temperature changes which are partly due to atmospheric variations of temperature and partly due to fluctuations of cable temperature due to variations of load current.

Since a number of widely different thermal coefficients of expansion are involved it is extremely difficult to maintain this arrangement free from leakage. Leakage involves loss of compound and/or ingress of air and moisture.

The compound in the bell is in direct contact with the compound in the cable and diffuses into the latter; any contamination of the bell compound by air or moisture therefore, eventually contaminates the cable compound with resultant tendency towards cable breakdown. The original filling of the bell in itself produces in general some such contamination since it is difficult in the field to produce a degree of dehydration, evacuation and degasification equal to that produced in the factory during the manufacture of the cable.

Finally, since the cable has a direct outlet into the bell the heating of the cable tends to force oil into the bell. Cooling of the cable tends to withdraw oil from the bell into the cable. This accelerates mixing of the compounds and accelerates contamination. Distension of the lead sheath also tends to drain the bell by promoting slow flow down the cable.

The bell may also be inserted at the end of a cable which has been led down a gradient or from a pylon carrying an overhead line. In such cases there is a hydrostatic head of oil which tends to fill up the bell and produce internal hydrostatic pressures. For this reason, it is often necessary to leave a gas "cushion" in the bell to restrict the maximum pressure built up or alternatively to attach a "sylphon" or reservoir system in which the gas cushion is separated from the oil by a diaphragm. The former method introduces gas within the end-bell and this gas goes into solution and eventually contaminates the cable. Both methods intrinsically keep the internal pressure of the bell at a fairly high level and accentuate the tendency to form leaks.

According to one feature of the present invention the pressure and contamination troubles in cable terminations indicated above are overcome by inserting a polymerised barrier or stop joint between the main cable and the end bell or other terminating device. Preferably this barrier is constituted by polymerised styrene.

A further feature of the invention, consists in the installation of a barrier at the base of the terminating device and the extension of the styrene insulation into the termination itself so that the cable is completely isolated from the oil filling in the terminating device.

Generally stated, the invention consists in isolating the compound in the cable from that in the termination by means of a barrier of polymerised styrene or the like and the above and other features of the invention will be understood from the following description taken in conjunction with the accompanying drawing.

Figure 1:
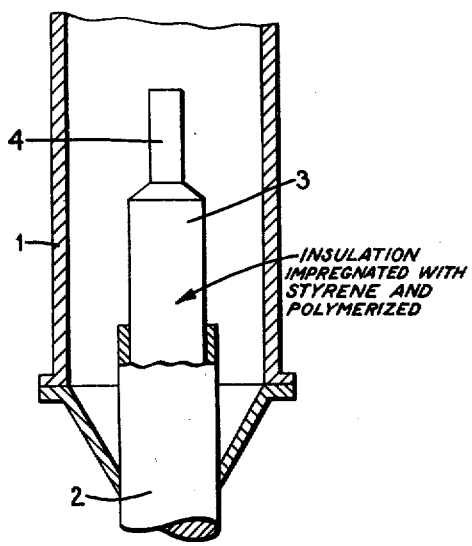
Fig. 1 is a diagram of the simplest form of cable termination according to this invention.

In Fig. 1 the cable is represented as terminating in a box 1 which may be a sealing bell, transformer gland, switchgear box or the like. The base of the box is suitably secured to the cable sheath 2 as by a wipe joint and in Fig. 1 the cable insulation 3 is impregnated with styrene and polymerised to form a solid plug of insulation extending into the lead sheath to form a complete barrier between the interior of the box and the remainder of the cable. The insulation may be impregnated and polymerised before removal of the lead sheath at the end of the cable and the projecting conductor 4 to which the terminal would be attached would be rendered solid by solder or other means if necessary to prevent communication therethrough.

Figure 2:
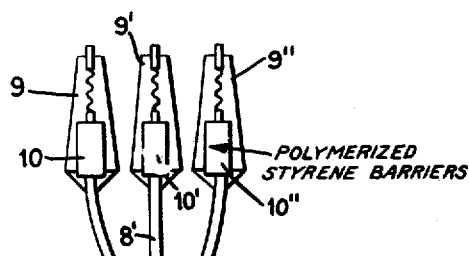
Fig. 2 is a diagram showing a method of applying the invention to multi-core cables.
Figure 2:
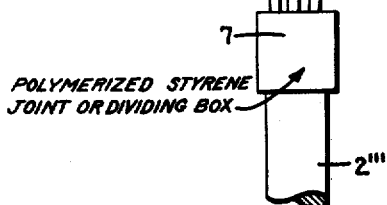

Fig. 2 illustrates diagrammatically a method of terminating a three core cable $2^{111}$ in which 7 indicates a dividing box or joint in which the cores are separated. The joint may be a polymerised joint or it may be an oil joint. Tail cables 8, $8^1$ and $8^{11}$ connect with the terminations or sealing bells 9, $9^1$ and $9^{11}$ each of which is provided with a polymerised barrier as indicated by 10, $10^1$ and $10^{11}$.

If a styrene joint is employed as joint 7 in conjunction with a termination and if the tail cable used is ordinary oil-impregnated cable, there will be two changeovers from styrene impregnation to oil-impregnation. One of these occurs in the joint and is similar to the change-over at the other side of the joint, i. e. it is standard and efficient. The second, however, occurs at the termination within the cone and is the region of greatest weakness. The cone grades the stress longitudinally but there is sudden variation of radial stress where the cable emerges from the lead i. e. at the commencement of the junction of styrene and oil impregnation. It would be preferable to transfer this junction to another place and it is therefore proposed to insert the tail cable unimpregnated in the first instance, to impregnate the portion in the termination and into the lead sheath for a short distance with styrene and to impregnate the remainder of the cable with oil. This can be done by sheath impregnation methods. The junction is thus transferred to a region where the paper insulation is regularly applied by machine and the electrical stress is truly radial.

It would be still nearer an ideal arrangement if the whole of the tail cable were impregnated with styrene. This can be effected by assembling and drying out the termination and unimpregnated tail cable in the factory and installing on site the termination and making the joint between tail and main cables mechanically. Thereafter the joint, tail cable, and termination can be simultaneously evacuated and can be filled with liquid styrene. Polymerisation may then be carried out and a solid styrene insulation created from the joint right through to (and including) the termination. The only objection to this procedure is the fact that the main impregnation and polymerisation of the tail and termination is transferred from the factory to the field where the efficiency of the process is likely to be less due to weather and local conditions.

The ideal method is therefore to carry out the process in the factory but the objection arises that the styrene impregnated tail cable after polymerisation is inflexible and brittle. The inflexibility and brittleness can be reduced to some extent by the incorporation of plasticisers and by carrying out the polymerisation under conditions of temperature and time which result in a tough product rather than a brittle product. In general however, rather more flexibility is required than can be obtained in this way.

It has been found however, that it is possible to check the polymerisation so that the product consisting of a mixture of liquid styrene together with polysterene is a plastic mass. This plastic mass will slowly become solid but the change will be so slow that it is possible to test and transfer to the field for installation, instal and joint, before the cable becomes inflexible. The polymerisation of the tail cable can then be continued to its final stage in conjunction with the joint. In this process it will be found more satisfactory to carry the polymerisation of the styrene in the termination to a higher degree than that of the tail cable. This can be effected by prolongation of local heating round the termination.

The tail cable may be of greater copper cross section than the main cable to induce cooler running so that sealing bell temperatures are reduced and mechanical troubles due to thermal expansion are reduced. The tail may also be of increased insulation (radial) dimensions so that the electrical stress effects (radial) in the termination are reduced and the factor of safety of the termination correspondingly raised.

Although the description given above applies only to supertension terminations there are other equally interesting applications at lower voltages down to L. T. Considerable trouble is experienced in the cabling of buildings when vertical runs are encountered and these terminate in disconnecting boxes or switchgear. This effect is accentuated if the ambient temperature is high. Bleeding of the cable ensues and the viscous or semi-solid filling compound of the box or switchgear end-box is thinned by the inflow of hot cable compound. Box leakage therefore occurs. This would be eliminated by a termination-tail combination in accordance with this invention.

What is claimed is:

1. The method of forming a tail cable which comprises impregnating a length of cable with polymerisable material, applying to one end of the cable a barrier of polymerisable material, subjecting the polymerisable materials to polymerisation and carrying the polymerisation of the material forming the barrier to a higher degree than that of the remainder of the cable.

2. A tail cable impregnated with partially polymerised material and having at one end a barrier of more completely polymerised material.

THOMAS ROBERTSON SCOTT.
JOHN KRAUSS WEBB.